US012529145B2

(12) United States Patent
Ishida et al.

(10) Patent No.: US 12,529,145 B2
(45) Date of Patent: Jan. 20, 2026

(54) PRETREATMENT METHOD FOR ELECTROLESS PLATING, AND PRETREATMENT SOLUTION FOR ELECTROLESS PLATING

(71) Applicant: C. Uyemura & Co., Ltd., Osaka (JP)

(72) Inventors: Tetsuji Ishida, Osaka (JP); Hisamitsu Yamamoto, Osaka (JP); Ryoyu Shimizu, Osaka (JP)

(73) Assignee: C. Uyemura & Co., Ltd., Osaka (JP)

( * ) Notice: Subject to any disclaimer, the term of this patent is extended or adjusted under 35 U.S.C. 154(b) by 206 days.

(21) Appl. No.: 17/631,837

(22) PCT Filed: Jun. 3, 2020

(86) PCT No.: PCT/JP2020/021966

§ 371 (c)(1),
(2) Date: Jan. 31, 2022

(87) PCT Pub. No.: WO2021/024599

PCT Pub. Date: Feb. 11, 2021

(65) Prior Publication Data

US 2022/0275516 A1 Sep. 1, 2022

(30) Foreign Application Priority Data

Aug. 2, 2019 (JP) ................................ 2019-142711

(51) Int. Cl.
*C23C 18/24* (2006.01)
*B01J 23/44* (2006.01)
*C23C 18/20* (2006.01)

(52) U.S. Cl.
CPC ............... *C23C 18/24* (2013.01); *B01J 23/44* (2013.01); *C23C 18/2086* (2013.01)

(58) Field of Classification Search
CPC ..... C23C 18/24; C23C 18/2086; C23C 18/30; C23C 18/32; C23C 18/38; C23C 18/2066;
(Continued)

(56) References Cited

U.S. PATENT DOCUMENTS

2008/0233161 A1* 9/2008 Djokic .................. A01N 59/16
424/618
2019/0169751 A1* 6/2019 Wendeln ................ C23C 18/40

FOREIGN PATENT DOCUMENTS

JP 02038578 A * 2/1990
JP 1990038578 2/1990
(Continued)

*Primary Examiner* — Dah-Wei D. Yuan
*Assistant Examiner* — Nga Leung V Law
(74) *Attorney, Agent, or Firm* — David R. Stevens; Stevens Law Group

(57) ABSTRACT

The purpose of the present invention is to provide a pretreatment method for electroless plating and a pretreatment solution for electroless plating capable of increasing an adsorption amount of a catalyst. A pretreatment method for electroless plating for performing an electroless plating on a substrate, the pretreatment method at least comprises: a cleaner process S10; a soft etching process S20 and/or an acid treatment process S30; a catalyst imparting process S40; and a catalyst reducing process S50, wherein an anionic surfactant for ionizing a part of a hydrophilic group to an anion is added to a treatment solution used in the soft etching process S20 and/or the acid treatment process S30, an ionic catalyst is imparted on the substrate in the catalyst imparting process S40, and the ionic catalyst is reduced in the catalyst reducing process S50 to increase an adsorption amount of the catalyst on the substrate.

6 Claims, 2 Drawing Sheets

(58) Field of Classification Search
CPC ............ C23C 18/1889; C23C 18/1893; C23C 18/208; C23C 18/26; B01J 23/44
See application file for complete search history.

(56) References Cited

FOREIGN PATENT DOCUMENTS

| | | | | |
|---|---|---|---|---|
| JP | 03090582 A | * | 4/1991 | |
| JP | 1991090582 | | 4/1991 | |
| JP | 2006070318 | | 3/2006 | |
| JP | 2012130910 | | 7/2012 | |
| JP | 2014019947 | | 2/2014 | |
| JP | 2015025198 | | 2/2015 | |
| JP | 2018009232 | | 1/2018 | |
| WO | WO-2014175008 A1 | * | 10/2014 | ......... B29C 45/0013 |

* cited by examiner

PRETREATMENT METHOD FOR ELECTROLESS PLATING, AND PRETREATMENT SOLUTION FOR ELECTROLESS PLATING

BACKGROUND OF THE INVENTION

Field of the Invention

The present invention relates to a pretreatment method for electroless plating for performing an electroless plating on a substrate and a pretreatment solution for electroless plating used in the pretreatment method. The present application claims priority based on Japanese Patent Application No. 2019-142711 filed in Japan on Aug. 2, 2019, which is incorporated by reference herein.

Description of Related Art

In the past, an adsorption amount of a palladium catalyst was increased for applying a sufficient electroless plating. For example, in a cleaner process and/or a predip process, it is performed to condition a resin surface in a state that a palladium catalyst tends to adsorb, or to consider a structure of a palladium complex in a catalyst imparting process.

Concretely, in Patent Literature 1, in a method for producing a printed circuit board by forming a metal conductor for connection between layers by applying an electroless plating to a through hole of a multi-layer flexible printed circuit board, a resin surface is conditioned in a state that a palladium catalyst tends to adsorb, by performing a conditioning process for a material to be treated, which is a pretreatment, in two stages of a first conditioning process for impregnating the material to be treated in an aqueous solution with an amine based surfactant as a main component, and a second conditioning process for impregnating the material to be treated in an aqueous solution with diols as a main component.

In addition, in Patent Literature 2, a structure of a palladium complex is considered by a composite of a compound (X) composed by polymerizing a monomer mixture (I) containing a (meth)acrylic monomer having one or more of anionic functional group selected from a carboxy group, a phosphate group, a phosphorous group, a sulfonate group, a sulfinic acid group and a sulfenic acid group, and metal nanoparticles (Y).

Patent Literature 1: JP 2006-070318 A

Patent Literature 2: JP 2015-025198 A

SUMMARY OF THE INVENTION

However, in recent years, a resin surface with a low roughening shape is required along with a miniaturization of a wiring, and an adsorption amount of a catalyst per unit area are becoming unable to be secured sufficiently as a surface roughness is becoming lower. Thus, a further increase of an adsorption amount of a catalyst is required.

Here, the purpose of the present invention is to provide a pretreatment method for electroless plating and a pretreatment solution for electroless plating capable of increasing an adsorption amount of a catalyst.

A pretreatment method for electroless plating relating to one embodiment of the present invention is a pretreatment method for electroless plating for performing an electroless plating on a substrate, the pretreatment method at least comprises: a cleaner process; a soft etching process and/or an acid treatment process; a catalyst imparting process; and a catalyst reducing process, wherein an anionic surfactant for ionizing a part of a hydrophilic group to an anion is added in the soft etching process and/or the acid treatment process, an ionic catalyst is imparted on the substrate in the catalyst imparting process, and the ionic catalyst is reduced in the catalyst reducing process to increase an adsorption amount of the catalyst on the substrate.

In this way, an adsorption amount of the catalyst is increased as an anionic surfactant with a structure having high affinity with both the catalyst and a cleaner component, which adsorbs on a surface of the substrate, will be adsorbed on a resin surface.

At this time, in one embodiment of the present invention, a predip process may not be included.

In this way, a predip solution is prevented from bringing to a solution used in the following catalyst imparting process, and also, an adsorption amount of the catalyst is increased while securing a property required for an electroless copper plating. Also, a number of pretreatment processes for electroless plating is decreased.

In addition, in one embodiment of the present invention, a concentration of the anionic surfactant may be 0.01 to 10 g/L.

In this way, the concentration will be appropriate and an adsorption amount of the catalyst is increased further.

In addition, in one embodiment of the present invention, the anionic surfactant may be one or more of a carboxylate, a sulfonate, a polyoxyethylene alkyl ether phosphate, and a polyacrylate.

In this way, a type of the anionic surfactant will be suitable and an adsorption amount of the catalyst is increased further.

In addition, in one embodiment of the present invention, the anionic surfactant may be an alkyl diphenyl ether disulfonate.

In this way, a type of the anionic surfactant will be more suitable and an adsorption amount of the catalyst is increased further.

In addition, in one embodiment of the present invention, the catalyst may be a palladium.

In this way, an adsorption amount of a palladium catalyst is increased.

In addition, other embodiment of the present invention is a pretreatment solution for electroless plating used in the pretreatment method for electroless plating, wherein an anionic surfactant for ionizing a part of a hydrophilic group to an anion is added in a soft etching solution and/or an acid treatment solution.

In this way, an adsorption amount of the catalyst is increased as an anionic surfactant with a structure having high affinity with both the catalyst and a cleaner component, which adsorbs on a surface of the substrate, is adsorbed on a resin surface.

In addition, in other embodiment of the present invention, the anionic surfactant may be one or more of a carboxylate, a sulfonate, a polyoxyethylene alkyl ether phosphate, and a polyacrylate.

In this way, a type of the anionic surfactant will be suitable and an adsorption amount of the catalyst is increased further.

In addition, in other embodiment of the present invention, the anionic surfactant may be an alkyl diphenyl ether disulfonate.

In this way, a type of the anionic surfactant will be more suitable and an adsorption amount of the catalyst is increased further.

As explained in the above, according to the present invention, a pretreatment method for electroless plating and a pretreatment solution for electroless plating capable of increasing an adsorption amount of a catalyst are provided.

DETAILED DESCRIPTION OF THE INVENTION

Hereinafter, explaining in detail about preferred embodiments of the present invention, with reference to the drawings. In addition, the embodiments explained in below will not unjustly limit the content of the present invention described in claims, and it is not limited that all the structures explained in the embodiments are necessary as means for solving the problem of the present invention.

[Pretreatment Method for Electroless Plating]

Figure 1:
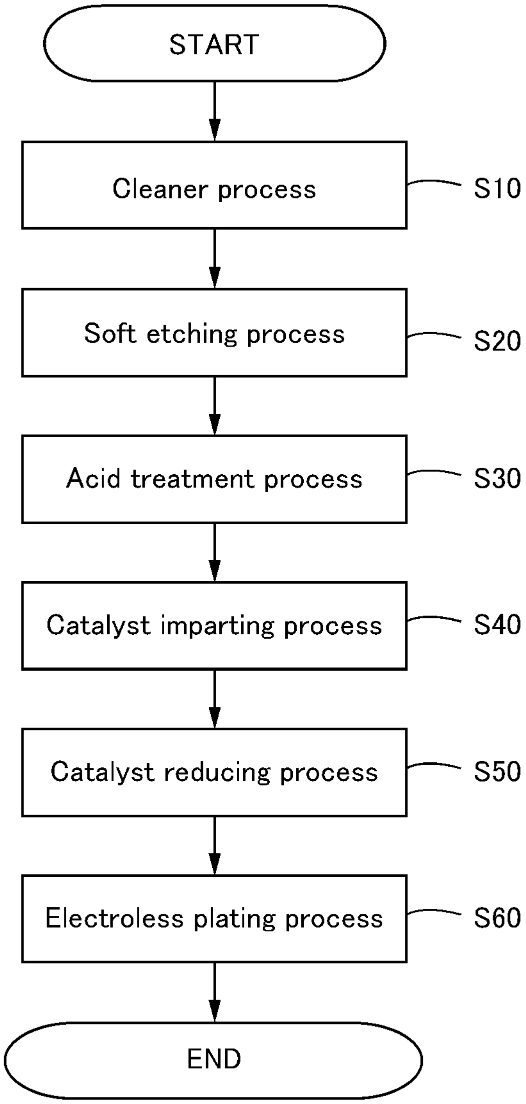
FIG. 1 is a flow chart illustrating an outline of a pretreatment method for electroless plating relating to one embodiment of the present invention.

As illustrated in FIG. 1, a pretreatment method for electroless plating relating to one embodiment of the present invention is a pretreatment method for performing an electroless plating on a substrate, at least comprising: a cleaner process S10; a soft etching process S20 and/or an acid treatment process S30; a catalyst imparting process S40, and a catalyst reducing process S50.

The substrate indicates a substrate in which an entire surface is composed of a resin, a substrate in which a resin and a metal such as a copper are mixed at a surface, and a substrate in which a through hole and/or a via hole are formed.

In the cleaner process S10, a wettability of a surface of the substrate and in the through hole and/or the via hole is improved. Also, a potential of a glass surface or a resin of the substrate and else are adjusted. In a cleaner solution used in the cleaner process S10, a cationic surfactant, an anionic surfactant, a nonionic surfactant, an amphoteric surfactant, an amine compound, a sulfuric acid, and else are added. In addition, the amine compound is preferably added when the cleaner solution is alkaline.

In the soft etching process S20, a metal such as a copper on the substrate is dissolved, and oxides on a metal surface and a surfactant adsorbed in the cleaner process S10 are removed.

In the pretreatment method for electroless plating relating to one embodiment of the present invention, an anionic surfactant for ionizing a part of a hydrophilic group to an anion is added in a treatment solution used in the soft etching process S20. In this way, an adsorption amount of a palladium catalyst is increased as the anionic surfactant with a structure having high affinity with both the catalyst and a cleaner component, which adsorbs on a surface of the substrate (especially, a resin surface), is adsorbed on a resin surface.

A sodium persulfate, a hydrogen peroxide, a sulfuric acid and else are added to the treatment solution used in the soft etching process S20 in addition to the anionic surfactant for ionizing a part of a hydrophilic group to an anion.

In the acid treatment process S30, oxides remaining on the metal surface such as a copper of the substrate are removed. The acid treatment process is also called an acid washing treatment.

Also, in the pretreatment method for electroless plating relating to one embodiment of the present invention, the anionic surfactant for ionizing a part of a hydrophilic group to an anion is added in a treatment solution used in the acid treatment process S30. In this way, an adsorption amount of a palladium catalyst is increased as the anionic surfactant with a structure having high affinity with both the catalyst and a cleaner component, which adsorbs on a surface of the substrate (especially, a resin surface), is adsorbed on a resin surface.

A sulfuric acid and else are added to the treatment solution used in the acid treatment process S30 in addition to the anionic surfactant for ionizing a part of a hydrophilic group to an anion.

In the pretreatment method for electroless plating relating to one embodiment of the present invention, the anionic surfactant for ionizing a part of a hydrophilic group to an anion may be added only in the treatment solution used in the soft etching process S20, on the other hand, the anionic surfactant for ionizing a part of a hydrophilic group to an anion may be added only in the treatment solution used in the acid treatment process S30. Also, the anionic surfactant for ionizing a part of a hydrophilic group to an anion may be added in both of treatment solutions used in the soft etching process S20 and the acid treatment process S30.

In the pretreatment method for electroless plating relating to one embodiment of the present invention, the anionic surfactant for ionizing a part of a hydrophilic group to an anion is added in the treatment solution used in the soft etching process S20 and/or the acid treatment process S30, but normally, there is no general idea to add a surfactant in the soft etching process S20 and/or the acid treatment process S30. This is because a purpose of the soft etching process S20 and the acid treatment process S30 is to remove the surfactant adsorbed in the cleaner process and oxides on the metal, and to remove oxides remaining on the metal, by dissolving the metal surface such as a copper for an infinitesimal amount. In the pretreatment method for electroless plating relating to one embodiment of the present invention, the surfactant is adsorbed on the substrate in the soft etching process S20 and/or the acid treatment process S30, in order to increase an impartment of the catalyst in the catalyst imparting process S40 and the catalyst reducing process S50.

A concentration of the anionic surfactant added to the treatment solution used in the soft etching process S20 and/or the acid treatment process S30 is preferably 0.01 to 10 g/L. When the concentration is less than 0.01 g/L, an amount of the surfactant adsorbed on a surface of the substrate is low, and the catalyst may not be able to adsorb on a surface of the substrate sufficiently in the following catalyst imparting process S40 and the catalyst reducing process S50. On the other hand, when the concentration is more than 10 g/L, an amount of the surfactant adsorbed on a surface of the substrate is sufficient, but a soft etching function or an acid treatment function may be inhibited. Also, a cost may be increased.

Also, a concentration of the anionic surfactant added to the treatment solution used in the soft etching process S20 and/or the acid treatment process S30 is more preferably 0.1 to 5 g/L, 0.15 to 0.35 g/L, 0.20 to 0.30 g/L.

The anionic surfactant is preferably one or more of a carboxylate, a sulfonate, a polyoxyethylene alkyl ether phosphate, and a polyacrylate. In this way, a type of the anionic surfactant will be suitable and an adsorption amount of the catalyst is increased further.

The anionic surfactant is preferably an alkyl diphenyl ether disulfonate. In this way, a type of the anionic surfactant will be more suitable and an adsorption amount of the catalyst is increased further.

A pretreatment process for electroless plating may be comprised of the cleaner process S10, the soft etching process S20, the acid treatment process S30, the catalyst imparting process S40, and the catalyst reducing process S50, or it may be comprised of the cleaner process S10, the acid treatment process S30, the soft etching process S20, the acid treatment process S30, the catalyst imparting process S40, and the catalyst reducing process S50, or when there is no copper on a surface of the substrate, it may be comprised of the cleaner process S10, the acid treatment process S30, the catalyst imparting process S40, and the catalyst reducing process S50.

In the catalyst imparting process S40, an ionic catalyst is imparted on the substrate. Concretely, metal complex ions of a palladium or the like is imparted on the substrate. The catalyst imparting process is also called an activator treatment.

In the catalyst imparting process S40 of the pretreatment method for electroless plating relating to one embodiment of the present invention, an ionic metal catalyst is used to be imparted on the substrate, instead of using a colloidal metal catalyst.

In the pretreatment method for electroless plating relating to one embodiment of the present invention, as a pretreatment of the catalyst imparting process S40, the anionic surfactant for ionizing a part of a hydrophilic group to an anion is adsorbed on the substrate in the soft etching process S20 and/or the acid treatment process S30. The ionic catalyst is used in the catalyst imparting process S40, because molecules are not compatible for the colloidal metal catalyst, which adsorb simply physically. In this way, molecules interact with each other and promote an adsorption action of the catalyst, as the surfactant adsorbed in the soft etching process S20 and/or the acid treatment process S30 and the ionic catalyst are having high affinity.

And, in the pretreatment method for electroless plating relating to one embodiment of the present invention, the ionic catalyst is imparted on the substrate in the catalyst imparting process S40, so the catalyst reducing process S50 to reduce the ionic catalyst is necessary. The catalyst reducing process is also called a reducer treatment.

A palladium salt such as a palladium chloride or a palladium sulfate, and an amine compound, an organic acid or the like as a complexing agent are added to a treatment solution used in the catalyst imparting process S40.

In the catalyst reducing process S50, a metal such as a palladium is reduced by reducing complex ions adsorbed on the substrate. In a treatment solution used in the catalyst reducing process S50, a pH buffer or the like is added to a reducing agent such as a dimethyl amine borane, a sodium borohydride, a sodium hypophosphite, or a hydrazine.

Also, in the pretreatment method for electroless plating relating to one embodiment of the present invention, a predip process before the catalyst imparting process S40 is not included preferably. The predip process is a process to promote an adsorption of a metal catalyst such as a palladium on a substrate. By not including the predip process, a predip solution to be used in this process is prevented from brought into the solution used in the catalyst imparting process. In other words, a bringing of an unnecessary component into the solution used in the catalyst imparting process is prevented. By a bringing of the predip solution, a settlement of a catalyst metal such as a palladium in the following catalyst imparting process may be promoted. Also, the predip solution is often acidic, and the treatment solution to be used in the following catalyst imparting process is often alkaline, so a bringing of the predip solution may promote a settlement of the catalyst metal further. On the other hand, when the predip process is not included, an adsorption amount of the palladium catalyst is increased while securing a property required for an electroless plating. Also, a number of pretreatment processes for electroless plating is decreased.

A surface roughness of the substrate is preferably Ra=1.3 μm or less, and more preferably Ra=1.0 μm or less, 0.8 μm or less, 0.6 μm or less, 0.5 μm or less, 0.3 μm or less, 0.2 μm or less, or 0.1 μm or less. An adsorption amount of the catalyst differs by a smoothness of the substrate, and generally when a surface roughness is large, an adsorption amount of the catalyst is increased, on the other hand, when a surface roughness is small, an adsorption amount of the catalyst is decreased. In addition, it is considered that this is because a surface area to which the catalyst adsorbs will be small when a surface roughness is small. And when an adsorption amount of the catalyst is decreased, an electroless plating will not be deposited sufficiently. Here, in the pretreatment method for electroless plating relating to one embodiment of the present invention, even with the substrate in which a surface roughness is small, an imparting amount of the catalyst can be increased sufficiently compared to a conventional method, and an electroless plating is deposited sufficiently.

The catalyst may be a palladium. A gold, a silver, a copper and else can be cited as the catalyst in addition to a palladium.

An electroless plating process S60 may be performed after the catalyst reducing process S50. In the electroless plating process S60, metal ions such as a copper are reduced and deposited with a palladium as a core. An additive of a publicly known plating solution is used as a plating solution used in the electroless plating process S60.

The electroless plating process S60 may be an electroless copper plating. Or it may be an electroless nickel plating.

Also, an accelerator process (unillustrated) may be added before the electroless plating process S60. A purpose of the accelerator process is to improve a reactivity on a metal by removing oxides on a metal surface such as a copper, and to improve an initial reactivity by supplying a formaldehyde which is a reducing agent on a surface of the substrate.

A formaldehyde, a sulfuric acid, an organic acid, a nonionic surfactant or the like is added to a treatment solution used in the accelerator process.

From the above, according to the pretreatment method for electroless plating relating to one embodiment of the present invention, an adsorption amount of the catalyst can be increased.

Also, as an adsorption amount of the catalyst can be increased, an electroless plating in the following process can be deposited surely and uniformly on a surface of the substrate.

[Pretreatment Solution for Electroless Plating]

Next, explaining about a pretreatment solution for electroless plating relating to other embodiment of the present invention. A pretreatment solution for electroless plating relating to other embodiment of the present invention is a pretreatment solution to be used in the pretreatment method for electroless plating. And, it is characterized in that an anionic surfactant for ionizing a part of a hydrophilic group to an anion is added in a soft etching solution and/or an acid treatment solution.

Here, the pretreatment solution is a solution to be used in a pretreatment, and it is a solution in which various metals and additives are condensed in one vessel, a solution in which various metals and additives are separated to a plurality of vessels and various metals and additives are condensed in each vessel, a solution in which the condensed solution is adjusted with water to prepare an initial make-up of electrolytic bath, and a solution in which various metals and additives are added and adjusted to prepare an initial make-up of electrolytic bath.

The anionic surfactant is preferably one or more of a carboxylate, a sulfonate, a polyoxyethylene alkyl ether phosphate, and a polyacrylate. In this way, a type of the anionic surfactant will be suitable and an adsorption amount of the catalyst is increased further.

The anionic surfactant is preferably an alkyl diphenyl ether disulfonate. In this way, a type of the anionic surfactant will be more suitable and an adsorption amount of the catalyst is increased further.

From the above, according to the pretreatment solution for electroless plating relating to one embodiment of the present invention, an adsorption amount of the catalyst can be increased.

Also, as an adsorption amount of the catalyst can be increased, an electroless plating in the following process can be deposited surely and uniformly on a surface of the substrate.

EXAMPLES

Next, explaining in more detail about a pretreatment method for electroless plating and a pretreatment solution for electroless plating relating to one embodiment of the present invention by using examples. In addition, the present invention is not limited to these examples.

Example 1

In an example 1, a resin substrate in which a copper foil of MCL-E-67 made by Hitachi Chemical Co., Ltd. was etched out (a copper foil was removed and dissolved) was used, and a surface roughness was Ra=1.3 μm. In addition, a surface roughness was measured by Contour GT-X made by BRUKER. Also, as illustrated in example 1 of FIG. 2, a pretreatment method for electroless plating was comprising a cleaner process, a soft etching process, an acid treatment process, a catalyst imparting process, and a catalyst reducing process.

Also, in example 1, following adjustments were made to a pretreatment solution for electroless plating. An anionic surfactant for ionizing a part of a hydrophilic group to an anion was added in the acid treatment process such that a concentration of the anionic surfactant will be 1 g/L (blending quantity=1.0 g/L). The anionic surfactant was sodium polycarboxylate. Also, a treatment solution used in the catalyst imparting process was a palladium catalyst of complex ions.

A treatment solution used in the soft etching process was a sodium persulfate and a sulfuric acid.

A method for measuring an adsorption amount of a palladium on the substrate was as follows.

The substrate obtained through the above processes was washed by water and dried. And, the substrate after dried was mixed with a concentrated hydrochloric acid and a concentrated nitric acid in a ratio of 3:1, and impregnated in 20 mL of an aqua regia diluted in two times by an ion exchanged water to dissolve a palladium. The aqua regia in which a palladium was dissolved was collected in a glass bottle, and a palladium concentration was quantified by an atomic absorption photometer. And, from an area of the substrate and the quantitative value, an adsorption amount of a palladium per 1 $dm^2$ of the substrate was calculated.

Example 2

In an example 2, the anionic surfactant was a sodium alkyl diphenyl ether disulfonate. Other than the above, it was similar to the example 1.

Example 3

In an example 3, the anionic surfactant was a sodium alkyl naphthalene sulfonate. Other than the above, it was similar to the example 1.

Example 4

In an example 4, the anionic surfactant was a sodium alkyl aryl sulfonate. Other than the above, it was similar to the example 1.

Example 5

In an example 5, the anionic surfactant was a sodium naphthalene sulfonic acid formalin condensate. Other than the above, it was similar to the example 1.

Example 6

In an example 6, the anionic surfactant was a sodium rauryl sulfate. Other than the above, it was similar to the example 1.

Example 7

In an example 7, the anionic surfactant was an ammonium polyoxyethylene alkylene ether sulfate. Other than the above, it was similar to the example 1.

Example 8

In an example 8, the anionic surfactant was a potassium polyoxyethylene alkyl ether phosphate. Other than the above, it was similar to the example 1.

Example 9

In an example 9, the anionic surfactant was a sodium polyacrylate. Other than the above, it was similar to the example 1.

Comparative Example 1

Figure 2:
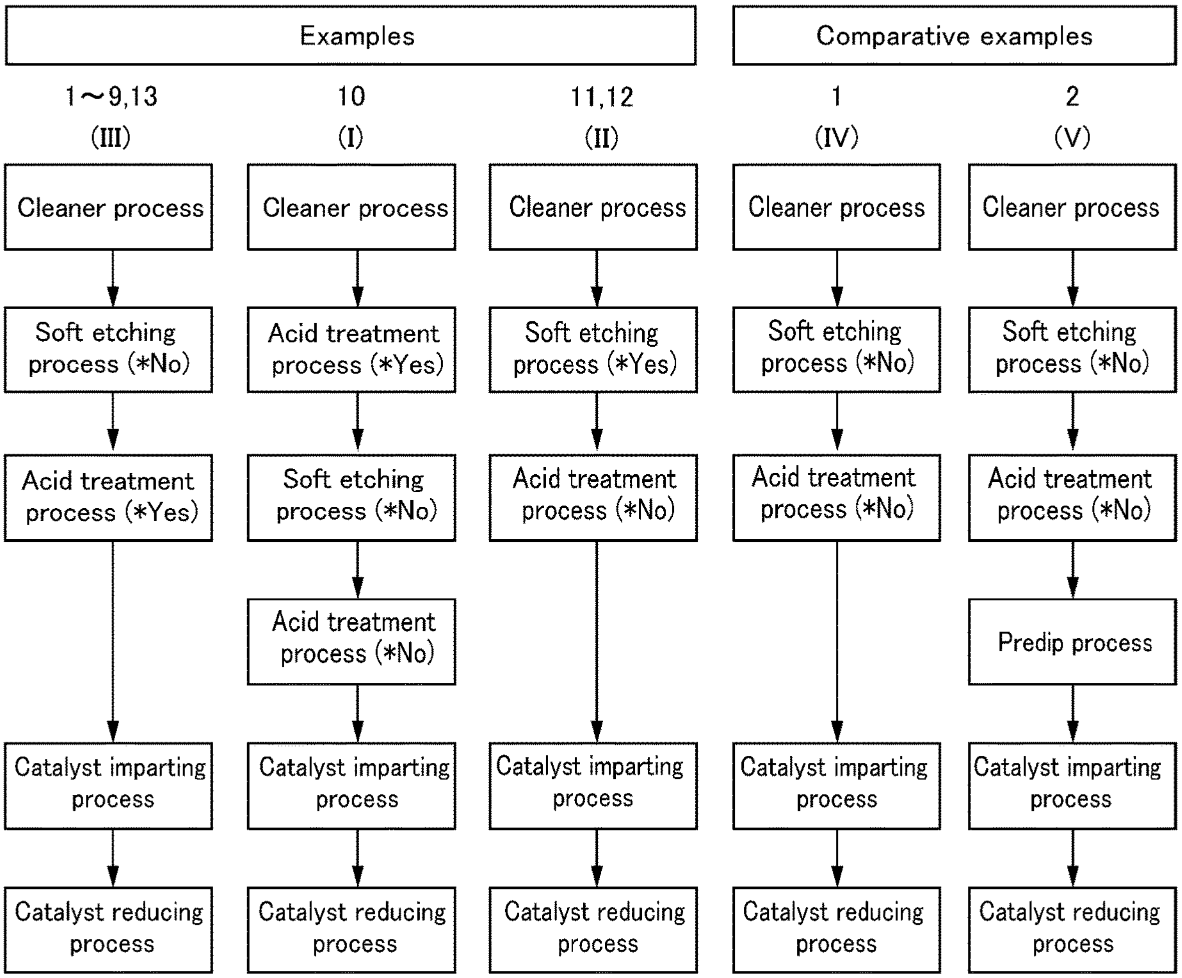
FIG. 2 is a schematic view of processes in examples and comparative examples of a pretreatment method for electroless plating relating to one embodiment of the present invention.

In a comparative example 1, as illustrated in a comparative example 1 of FIG. 2, the method was comprising a cleaner process, a soft etching process, an acid treatment process, a catalyst imparting process, and a catalyst reducing process. The anionic surfactant was not added to treatment solutions used in the soft etching process and the acid treatment process. Other than the above, it was similar to the example 1.

Comparative Example 2

In a comparative example 2, as illustrated in a comparative example 2 of FIG. 2, the method was comprising a cleaner process, a soft etching process, an acid treatment process, a predip process, a catalyst imparting process, and a catalyst reducing process. Other than the above, it was similar to the example 1.

Conditions of the examples 1 to 9 and the comparative examples 1 and 2, and results of an adsorption amount of a palladium (μg/dm$^2$) are indicated in Table 1.

Example 10

In an example 10, as illustrated in the example 10 of FIG. 2, the method was comprising a cleaner process, an acid treatment process (first), a soft etching process, the acid treatment process (second), a catalyst imparting process, and a catalyst reducing process (type I). And, the anionic surfactant was added in the first acid treatment process. Also, the anionic surfactant was a sodium alkyl diphenyl ether disulfonate. Also, a concentration of the anionic surfactant was 0.5 g/L. Other than the above, it was similar to the example 1.

TABLE 1

| | Anionic surfactant | Compound name | Blending quantity (g/L) | Rd adsorption amount (μg/dm$^2$) | Remarks |
|---|---|---|---|---|---|
| Example 1 | Carboxylate | Sodium polycarboxylate | 1.0 | 44 | No predip process |
| Example 2 | Sulfonate | Sodium alkyl diphenyl ether disulfonate | 1.0 | 62 | |
| Example 3 | | Sodium alkyl naphthalene sulfonate | 1.0 | 40 | |
| Example 4 | | Sodium alkyl aryl sulfonate | 1.0 | 42 | |
| Example 5 | | Sodium naphthalene sulfonic acid formalin condensate | 1.0 | 40 | |
| Example 6 | | Sodium rauryl sulfate | 1.0 | 48 | |
| Example 7 | | Ammonium polyoxyethylene alkylene ether sulfate | 1.0 | 40 | |
| Example 8 | Others | Potassium polyoxyethylene alkyl ether phosphate | 1.0 | 54 | |
| Example 9 | | Sodium polyacrylate | 1.0 | 43 | |
| Comparative example 1 | — | — | — | 31 | No predip process (conventional process) |
| Comparative example 2 | — | — | — | 38 | Including predip process (conventional process) |

As a result, in the examples 1 to 9, in which the anionic surfactant for ionizing a part of a hydrophilic group to an anion was added in a treatment solution used in the soft etching process and/or the acid treatment process, an adsorption amount of a palladium was higher than the comparative examples 1 and 2, and it was 40 μg/dm$^2$ or more. Also, an adsorption amount of a palladium in all examples was higher than the comparative example 2 comprising the predip process. Further, among the anionic surfactant, an alkyl diphenyl ether disulfonate was especially excellent with respect to an adsorption amount of a palladium.

Next, it was evaluated further by changing a process to add the anionic surfactant or an order to add the anionic surfactant. Concretely, as the processes, types I to V were performed as below.

Type I: Cleaner process→Acid treatment process (anionic surfactant was added)→Soft etching process→Acid treatment process→Catalyst imparting process→Catalyst reducing process.

Type II: Cleaner process→Soft etching process (anionic surfactant was added)→Acid treatment process→Catalyst imparting process→Catalyst reducing process.

Type III: Cleaner process→Soft etching process→Acid treatment process (anionic surfactant was added)→Catalyst imparting process→Catalyst reducing process.

Type IV: Cleaner process→Soft etching process→Acid treatment process→Catalyst imparting process→Catalyst reducing process. Anionic surfactant was not added.

Type V: Cleaner process→Soft etching process→Acid treatment process→Predip process→Catalyst imparting process→Catalyst reducing process. Anionic surfactant was not added.

Conditions of examples 10 to 13 are indicated in below.

Example 11

In an example 11, as illustrated in the example 11 of FIG. 2, the method was comprising a cleaner process, a soft etching process, an acid treatment process, a catalyst imparting process, and a catalyst reducing process (type II). And, the anionic surfactant was added in the soft etching process. Other than the above, it was similar to the example 10.

Example 12

In an example 12, as illustrated in the example 12 of FIG. 2, the method was comprising a cleaner process, a soft etching process, an acid treatment process, a catalyst imparting process, and a catalyst reducing process. And, the anionic surfactant was added in the soft etching process (type II). Also, a treatment solution used in the soft etching process was a hydrogen peroxide and a sulfuric acid. Other than the above, it was similar to the example 10.

Example 13

In an example 13, as illustrated in the example 13 of FIG. 2, the method was comprising a cleaner process, a soft etching process, an acid treatment process, a catalyst imparting process, and a catalyst reducing process (type III). And, the anionic surfactant was added in the acid treatment process. Other than the above, it was similar to the example 10.

The above conditions and results are indicated in Table 2.

TABLE 2

| | Process to add anionic surfactant | Blending quantity (g/L) | Pd adsorption amount (μg/dm²) | Remarks |
|---|---|---|---|---|
| Example 10 | Acid treatment process after cleaner process | 0.5 | 55 | — |
| Example 11 | Soft etching process (sodium persulfate/sulfuric acid) | 0.5 | 55 | — |
| Example 12 | Soft etching process (hydrogen peroxide/sulfuric acid) | 0.5 | 58 | — |
| Example 13 | Acid treatment process after soft etching process | 0.5 | 56 | — |
| Comparative example 1 | — | — | 31 | No predip process (conventional process) |
| Comparative example 2 | — | — | 38 | Including predip process (conventional process) |

As a result, even with the examples 10 to 13, in which a concentration of the anionic surfactant was half of a concentration of the example 2, an adsorption amount of a palladium was higher than the comparative examples 1 and 2. Also, even when a process to add the anionic surfactant was changed, an adsorption amount of a palladium was higher than the comparative examples 1 and 2, and there was no significant difference between the types I, II, and III. Also, there was no significant difference by a type of the treatment solution (sodium persulfate or hydrogen peroxide) used in the soft etching process.

Next, it was evaluated by changing a type of a substrate and a surface roughness. Conditions of examples 14 to 17 and comparative examples 3 to 8, which were evaluated by changing the above, are indicated in below.

Example 14

In an example 14, as the substrate, a substrate with entire resin surface of ABF GX92R made by Ajinomoto Fine-Techno Co., Inc. was used, and a surface roughness after a desmear treatment was Ra=0.3 μm. Also, the anionic surfactant was a sodium alkyl diphenyl ether disulfonate. Also, a concentration of the anionic surfactant was 0.5 g/L. Other than the above, it was similar to the example 1.

Comparative Example 3

In a comparative example 3, the anionic surfactant was not added in the acid treatment process. Other than the above, it was similar to the example 14.

Example 15

In an example 15, as the substrate, a substrate with entire resin surface of ABF GXT31R2 made by Ajinomoto Fine-Techno Co., Inc. was used, and a surface roughness after a desmear treatment was Ra=0.3 μm. Other than the above, it was similar to the example 14.

Comparative Example 4

In a comparative example 4, the anionic surfactant was not added in the acid treatment process. Other than the above, it was similar to the example 15.

Example 16

In an example 16, as the substrate, a substrate with entire resin surface of ABF GY5OR made by Ajinomoto Fine-Techno Co., Inc. was used, and a surface roughness after a desmear treatment was Ra=0.1 μm. Other than the above, it was similar to the example 14.

Comparative Example 5

In a comparative example 5, the anionic surfactant was not added in the acid treatment process. Other than the above, it was similar to the example 16.

Comparative Example 6

In a comparative example 6, the anionic surfactant was not added in the acid treatment process. Also, a predip process was added before the catalyst imparting process. Other than the above, it was similar to the example 16.

Example 17

In an example 17, as the substrate, a resin substrate in which a copper foil of CCL-HL832NS made by MITSUBISHI GAS CHEMICAL COMPANY, INC. was etched out (a copper foil was removed and dissolved) was used, and a surface roughness was Ra=1.0 μm. Other than the above, it was similar to the example 14.

Comparative Example 7

In a comparative example 7, the anionic surfactant was not added in the acid treatment process. Other than the above, it was similar to the example 17.

Comparative Example 8

In a comparative example 8, the anionic surfactant was not added in the acid treatment process. Also, a predip process was added before the catalyst imparting process. Other than the above, it was similar to the example 17.

Conditions and results of the above examples 14 to 17 and comparative examples 3 to 8 are indicated in Tables 3 to 6.

TABLE 3

| | Type of resin | Surface roughness Ra (μm) | Blending quantity (g/L) | Pd adsorption amount (μg/dm$^2$) | Remarks |
|---|---|---|---|---|---|
| Example 14 | ABF GX92R | 0.3 | 0.5 | 69 | No predip process |
| Comparative example 3 | | | | 39 | No predip process (conventional process) |

TABLE 4

| | Type of resin | Surface roughness Ra (μm) | Blending quantity (g/L) | Pd adsorption amount (μg/dm$^2$) | Remarks |
|---|---|---|---|---|---|
| Example 15 | ABF GXT31R2 | 0.3 | 0.5 | 73 | No predip process |
| Comparative example 4 | | | | 34 | No predip process (conventional process) |

TABLE 5

| | Type of resin | Surface roughness Ra (μm) | Blending quantity (g/L) | Pd adsorption amount (μg/dm$^2$) | Remarks |
|---|---|---|---|---|---|
| Example 16 | ABF GY50R | 0.1 | 0.5 | 36 | No predip process |
| Comparative example 5 | | | | 23 | No predip process (conventional process) |
| Comparative example 6 | | | | 29 | Including predip process (conventional process) |

TABLE 6

| | Type of resin | Surface roughness Ra (μm) | Blending quantity (g/L) | Pd adsorption amount (μg/dm$^2$) | Remarks |
|---|---|---|---|---|---|
| Example 17 | CCL-HL832NS | 1.0 | 0.5 | 43 | No predip process |
| Comparative example 7 | | | | 25 | No predip process (conventional process) |
| Comparative example 8 | | | | 37 | Including predip process (conventional process) |

As a result, in all examples, even when a type of the substrate and a surface roughness were changed, an adsorption amount of a palladium was higher than the comparative examples.

As can be seen from Tables 1 to 6, an adsorption amount of a palladium differs by a surface roughness, and differs by a type of a resin even when a surface roughness is same, but in all surface roughness and all types of resin, an adsorption amount of a palladium of the pretreatment method for electroless plating and the pretreatment solution for electroless plating relating to one embodiment of the present invention was higher than a conventional process. The pretreatment method for electroless plating and the pretreatment solution for electroless plating relating to one embodiment of the present invention are effective even when a surface roughness is small. Further, as a type of the anionic surfactant for ionizing a part of a hydrophilic group to an anion, an alkyl diphenyl ether disulfonate was most excellent.

From the above, by applying the pretreatment method for electroless plating and the pretreatment solution for electroless plating relating to one embodiment of the present invention, an adsorption amount of the catalyst was increased.

In addition, it is explained in detail about each embodiment and each example of the present invention as the above, but it can be understood easily for those who skilled in the art that various modifications can be made without practically departing from new matters and effect of the present invention. Therefore, all such variants should be included in the scope of the present invention.

For example, terms described with different terms having broader or equivalent meaning at least once in description and drawings can be replaced with these different terms in any part of description and drawings. In addition, operation and configuration of the pretreatment method for electroless plating and the pretreatment solution for electroless plating are not limited to those explained in each embodiment and each example of the present invention, and various modifications can be made.

Glossary Of Drawing References

S10 Cleaner process
S20 Soft etching process
S30 Acid treatment process
S40 Catalyst imparting process
S50 Catalyst reducing process
S60 Electroless plating process

The invention claimed is:

1. A pretreatment method for electroless plating for performing an electroless plating on a substrate, the pretreatment method at least comprises a cleaner process; a soft etching process; an acid treatment process; a catalyst imparting process; and a catalyst reducing process, wherein the cleaner process comprises cleaning the substrate with a cleaner solution having a first surfactant, wherein the soft etching process comprises etching the substrate, dissolving a metal disposed on at least a portion of the substrate, and removing the first surfactant with a first treatment solution that includes a first acid, wherein the acid treatment process comprises washing the substrate with a second treatment solution that includes a second acid, wherein the catalyst imparting process comprises imparting an ionic catalyst on the substrate, wherein the catalyst reducing process comprises reducing complex ions adsorbed on the substrate to metal, and wherein an anionic surfactant for ionizing a part of a hydrophilic group to an anion is added to the first treatment solution and the second treatment solution, and the ionic catalyst is reduced in the catalyst reducing process to increase an adsorption amount of the catalyst on the substrate.

2. The pretreatment method for electroless plating according to claim 1, wherein the pretreatment method enables adsorption of a metal catalyst on the substrate without requiring a predip process to facilitate the adsorption.

3. The pretreatment method for electroless plating according to claim 1, wherein a concentration of the anionic surfactant is 0.01 to 10 g/L.

4. The pretreatment method for electroless plating according to claim 1, wherein the anionic surfactant is one or more of a carboxylate, a sulfonate, a polyoxyethylene alkyl ether phosphate, and a polyacrylate.

5. The pretreatment method for electroless plating according to claim 1, wherein the anionic surfactant is an alkyl diphenyl ether disulfonate.

6. The pretreatment method for electroless plating according to claim 1, wherein the catalyst is a palladium.

* * * * *